United States Patent [19]

Lorenzini

[11] Patent Number: 4,485,559
[45] Date of Patent: Dec. 4, 1984

[54] MOUTHPIECE FACING GAUGE

[76] Inventor: Robert A. Lorenzini, P.O. Box 91, Hancock, Mass. 01237

[21] Appl. No.: 448,977

[22] Filed: Dec. 13, 1982

[51] Int. Cl.³ .......................... G01B 5/00; G01B 5/20
[52] U.S. Cl. ................................. 33/174 R; 33/174 P
[58] Field of Search ............ 33/174 R, 174 E, 174 M, 33/174 P, 174 Q

[56] References Cited

U.S. PATENT DOCUMENTS

| | | | |
|---|---|---|---|
| 1,832,953 | 11/1931 | Watling et al. | 33/174 E |
| 2,820,300 | 1/1958 | Gadomski | 33/174 R |
| 3,217,418 | 11/1965 | Wennerberg | 33/174 Q |
| 3,678,585 | 7/1972 | Dabrush et al. | 33/174 P |
| 4,096,634 | 6/1978 | Gudel | 33/174 M |
| 4,251,922 | 2/1981 | Perlotto | 33/174 P |

Primary Examiner—Richard R. Stearns

[57] ABSTRACT

A facing gauge is provided for accurately determining the dimensions of the windway used within woodwind instrument mouthpieces. The gauge consists of a table arrangement which includes a depth-measuring gauge along with a linear-distance-measuring gauge for accurately determining the dimensions of the side rails and the tip rail. The gauge also provides a detailed measurement of the shape and contour of the baffle portion of the mouthpiece.

25 Claims, 9 Drawing Figures

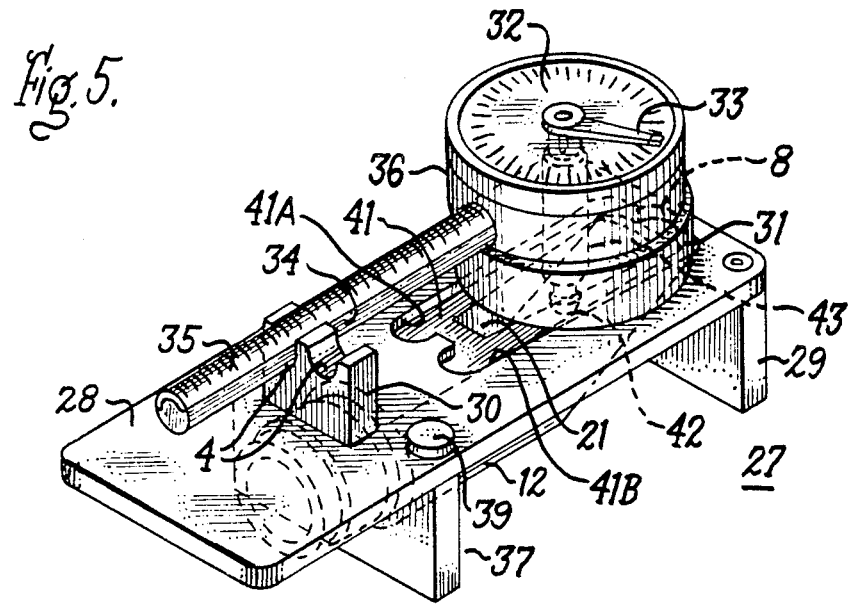
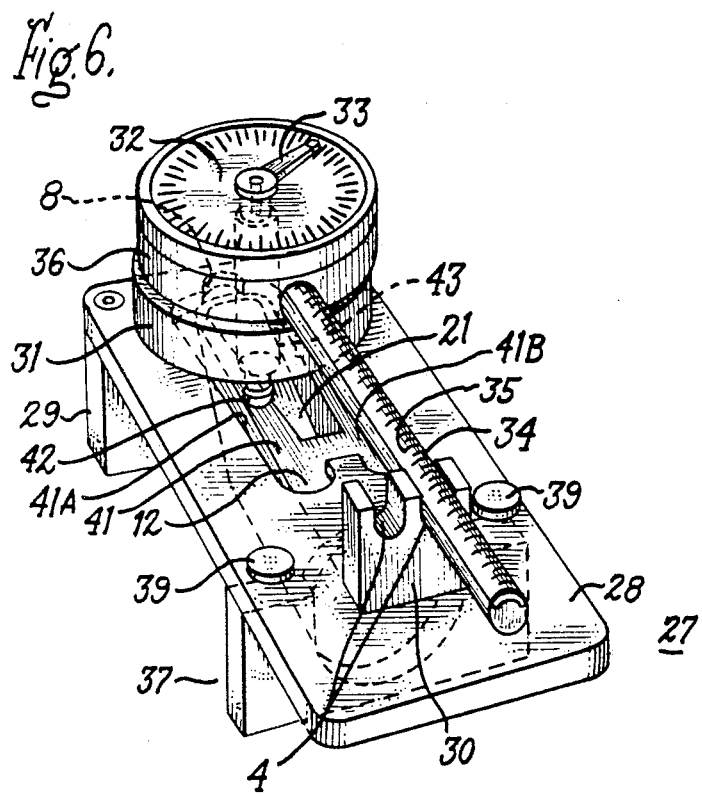

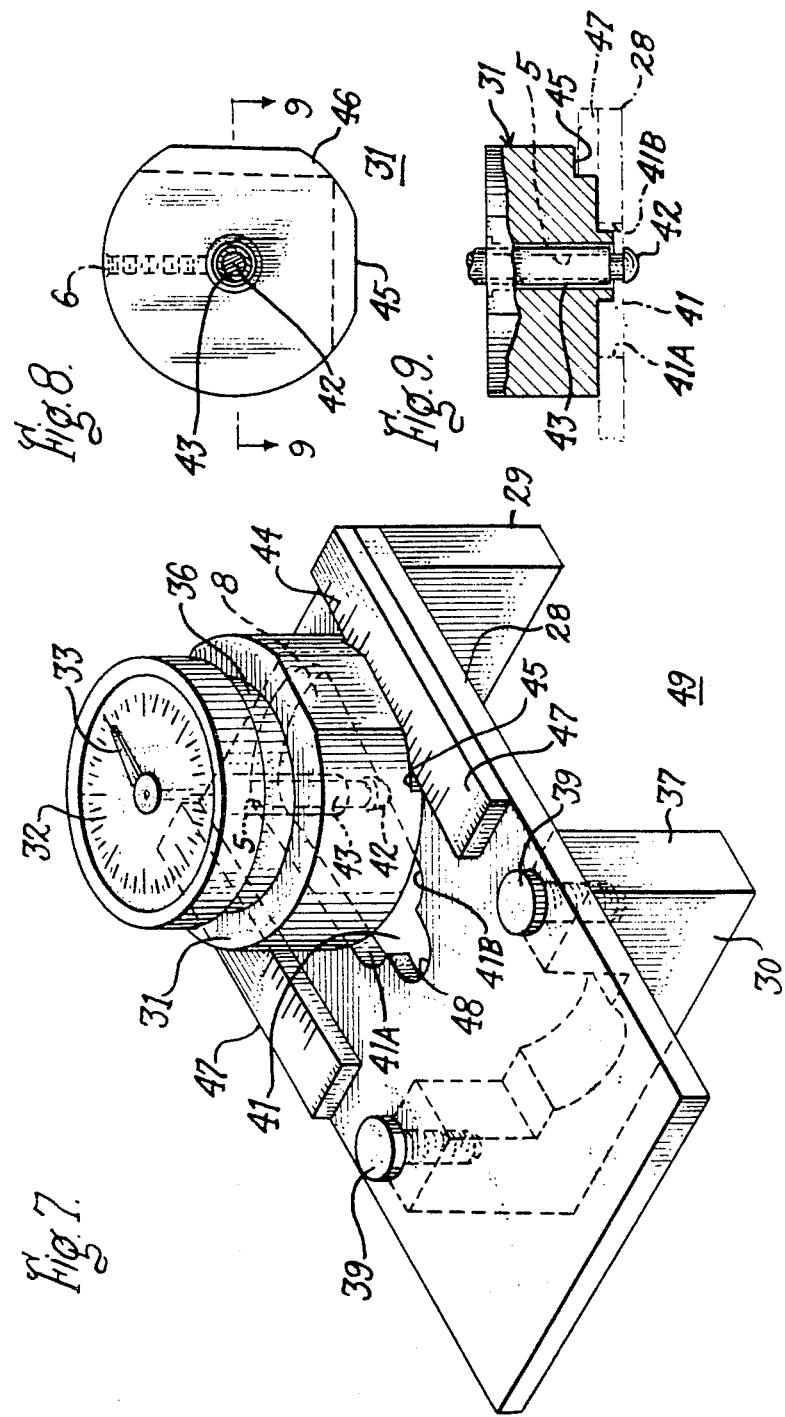

MOUTHPIECE FACING GAUGE

BACKGROUND OF THE INVENTION

Means are currently available for determining the facing of woodwind instrument mouthpieces. An assortment of feeler gauges, a glass reference gauge, and a separate tapered gauge are used to measure the important parameters of the mouthpiece. One problem with state of the art mouthpiece facing gauges is the lack of precision with which the curve of the facing is measured. Since feeler gauges are employed, the thinnest practical feeler gauge currently obtainable is in the order of 0.0015 inches. A feeler gauge of such dimensions is very fragile and is easily bent or even kinked during the measurement process. More important it cannot tell you where the curve of the mouthpiece starts. The glass gauge commonly employed for measuring the facing is graduated in millimeters whereas the feeler gauges are usually graduated in fractions of an inch. The use of two different systems of measurement can be quite complex for even an experienced instrument repairer.

The purpose of this invention is to provide a single mouthpiece facing gauge wherein all the measurements are fast and reproducible in thousandths of an inch or millimeters with accuracies within a fraction of 1/1000 of an inch.

SUMMARY OF THE INVENTION

The invention comprises a flat measuring bench having means for holding the mouthpiece and the dial indicator measuring device. A circular protrusion at the bottom of the dial indicator extends through an opening in the bench and contacts the mouthpiece facing region. The contour of the side rails and the tip rail are made by moving the dial gauge along the slotted aperature in the gauge bench. Linear displacement readings are provided by means of a graduated rod supported on the gauge bench.

BRIEF DESCRIPTION OF THE DRAWINGS

FIG. 5 is a side perspective view of the mouthpiece facing gauge according to the invention with the mouthpiece depicted in FIGS. 2 and 4 attached thereto;

FIG. 6 is a top perspective view of the mouthpiece facing gauge depicted in FIG. 5;

FIG. 7 is a top perspective view of a further embodiment of the mouthpiece facing gauge according to the invention;

FIG. 8 is a plan view in partial section of the hub used within the embodiment depicted in FIG. 7; and FIG. 9 is a side sectional view through the 9—9 plane of the hub depicted in FIG. 8.

GENERAL DESCRIPTION OF THE INVENTION

The invention relates to a mouthpiece facing gauge used to accurately measure the dimensions of the windway used with clarinet and saxophone mouthpieces. These dimensions are particularly useful to a mouthpiece manufacturer as well as to a repairer of musical instruments and to a discriminating musician. In operation, the reed of the mouthpiece, continuously vibrates in the windway region causing a change in the windway dimensions over long periods of continued use. It is desired when refacing the windway dimensions to try to maintain the original contour in order not to vary the tonal quality and pitch of the mouthpiece. The critical windway dimensions can be recorded on a piece of graph paper and periodic measurements over continued periods of use can be made in order to determine any variations from the original dimensions.

DESCRIPTION OF THE PREFERRED EMBODIMENT

Figure 1:
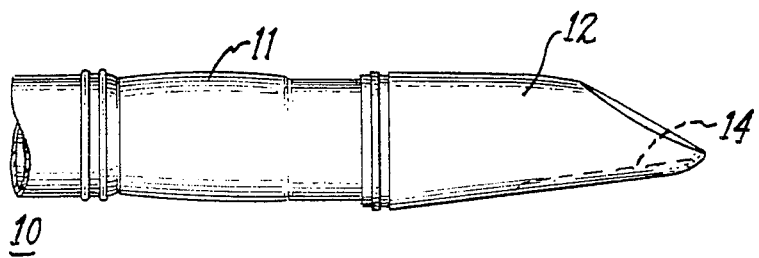
FIG. 1 is a side view of a portion of a clarinet body and a clarinet mouthpiece containing a windway region.

One example of a woodwind instrument is the clarinet 10 shown in FIG. 1 and consisting of a clarinet body portion which attaches to a removable mouthpiece 12 of the type containing a reed 13 located relative to the windway 14 of the mouthpiece 12. As described earlier, the reed 13 over long periods of continuous use can create a variation in the dimensions of the windway.

Figure 2:
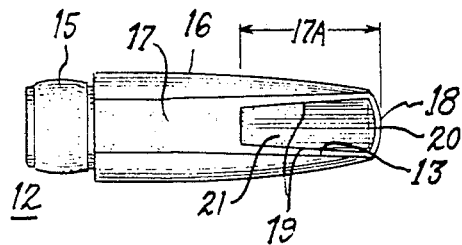
FIG. 2 is a top view of the mouthpiece depicted in FIG. 1.
Figure 3:
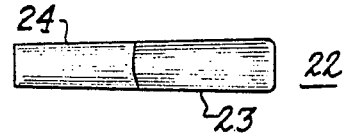
FIG. 3 is a top view of a reed used within the mouthpiece depicted in FIGS. 1 and 2.

The mouthpiece 12 in FIG. 2 is described as consisting of a connective portion 15 which fits inside the end of the clarinet body 11 shown in FIG. 1. The mouthpiece contains a casing 16 made from a material such as hard rubber, glass or plastic. The table 17 consists of a flat portion extending along the top surface of mouthpiece 12 and includes a windway 17A at the end of the said connector 15. Windway 17A is a very important portion of the mouthpiece which serves to support the reed 22 shown in FIG. 3. Windway 17A contains a windway slot 21 having a non-rectangular configuration and is defined by a tip rail 18 and a pair of side rails 19. The region of the mouthpiece immediately adjacent the tip rail is known as the baffle 20 and it is well-known that the shape and contour of the baffle has a very great effect on the response of the mouthpiece. The reed 22 shown in FIG. 3 consists of a reed body 24 made of a special cane material having a vamp 23 which is usually hand-formed to a particular contour. The reed is shown relative to the table 17 in FIG. 2 such that the vamp portion 23 completely covers the windway slot 21. The edges of the vamp 23 region of the reed are supported by the side rails 19 and the tip rail 18. The reed is supported on the mouthpiece preferably by a ligature that allows for optimum vibration properties.

Figure 4:
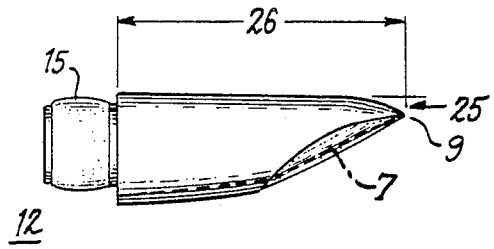
FIG. 4 is a side view of the mouthpiece depicted in FIG. 2.

In FIG. 4 mouthpiece 12 is shown with the facing region 26 in a downward position and the mouthpiece tip 9 is defined opposite the connector portion 15. A tip opening 25 is shown at the tip end of facing 26 leading into chamber 7 shown in dashed lines.

The mouthpiece facing gauge 27 shown in FIG. 5 consists of a table 28 usually of a polished steel and includes a fence 29 depending from the bottom portion of the table and usually made from a plastic composition. Mouthpiece 12 is positioned under table 28 by bringing the mouthpiece tip 9 into abutting contact with fence 29 and clamping the mouthpiece by means of a clamp 37 having plastic side members 39 and a bottom member 38 which partially encompass the body and hold it up against the bottom side of table 28. Clamp screws 39 extending through the table are gently tightened in order to hold the mouthpiece in position during the measurement procedure. Access to the mouthpiece windway 17A is made through an opening 41 in table 28. The dimensions of table opening 41 coincide with that of the slot 21 shown earlier in FIG. 2 and side walls 41A, 41B follow the same angles presented by the side rails 19 of slot 21. A dial 32 consisting of a dial indicator 33, rod support 36, hub 31, and spindle 42 are supported on table 28. Also supported on table 28 is a rod 34 having a plurality of calibration indicia 35 for determining the linear dimensions along the windway. The measurements of the side rails 19 and tip rail 18 of FIG. 2 are made by moving spindle 42 along the side rails and recording the differences in the depth on dial indicator 33 as well as the linear dimensions on rod 34. Moving the dial 32 such that the spindle 42 follows the interior of table opening 41 results in a good profile of the entire windway 17A. To measure the tip opening 25 shown in FIG. 4 cylindrical protrusion 43 is taken from table 41 and placed within a semi-cylindrical opening 8 through fence 29 at the back center portion of the table so that the mouthpiece 12 remains clamped to the bottom of table 28.

Gauge 27 is shown in FIG. 6 in order to portray the manner in which rod 34 is aligned with the non-rectangular opening 41 within table 28. A pair of V-grooves 4 are located on guide 30 and spaced to correspond with the narrower portion of opening 41 which spreads out to follow the contour of the windway slot 21 as described earlier. When one of the side rails 19 are measured, rod 34 is moved to the other of the V-grooves in order to measure the other side rail without having to remove the mouthpiece from the bottom of table 28. The dial 32, dial gauge 33, rod support 36, hub 31, and cylindrical protrusion 42 remain in the same space relationship on table 28 when rod 39 is within either of the two V-grooves 6.

By using a dial 32 having a spindle 42 with a longer travel, gauge 27 can be used to measure the contour of chamber 8 shown in FIG. 4 and baffle 20 shown in FIG. 2 in the same manner.

A further embodiment of a mouthpiece facing gauge 49, shown in FIG. 7, more readily accommodates both smaller mouthpieces such as the clarinet mouthpiece 12 depicted in FIGS. 1, 2 and 4 as well as a larger woodwind mouthpiece such as for a saxophone and oboe (not shown). In the following description like reference numerals will be used to denote the elements which are similar to the gauge 27 shown in FIGS. 5 and 6. Here a dial 32 having an indicator 33 is supported upon a support 36 which in turn rests upon a hub 31. A spindle 42 extends through cylindrical prosection 43 which is used within table opening 41 in the same manner as described for the gauge 27 depicted in FIGS. 5 and 6. Table opening 41 includes a cylindrical slot 48 in table 28 used to allow for measuring the concavity of the mouthpiece, if such dimension is desired. Also shown attached to table 28 are a fence 29 and clamp 37. Clamp 37 is attached to the table by means of screws 39 and retains the mouthpiece in the same manner as described for the earlier gauge 27. Gauge 49 differs from gauge 27 by eliminating rod 35 and adding a pair of guide bars 47 which include indicia gradations 44 and guide grooves 45, 46 formed into the bottom of hub 31. The mouthpiece is inserted in the same manner as described for gauge 27 and the hub 31 is positioned such that either the short guide groove 45 or the long guide groove 46, shown in FIG. 8, is positioned on guide bar 47. The short guide groove is used for clarinet mouthpieces and corresponds to the facing of a clarinet mouthpiece and the long guide groove is used for measuring the facing of alto and tenor saxophone mouthpieces. Moving indicator 33 within table opening 41 with the cylindrical prosection 43 against sides 41A, 41B of table opening 41, and noting the readings on both indicator 33 and gradations 44 allow the contour of both side rails of the mouthpiece to be measured. An opening 8 is also provided through fence 29 to accommodate insertion of spindle 42 when the mouthpiece is to be measured. Once hub 31 is is placed over guide bar 47 by means of either guide groove 46 or 45, as shown in FIG. 8, the hub is secured to the cylindrical protrusion 43 over spindle 42 by means of a set screw inserted within screw hole 6.

FIG. 9 shows the arrangement of hub 31 on table 28 with rod 7 extending through cylindrical prosection 43 to spindle 42 and cylindrical prosection 43 within side walls 41A, 41B of table opening 41. Guide groove 45 rests on guide bar 47 when selected for clarinet mouthpieces, as described earlier, otherwise guide groove 46 (FIG. 8) would be used for larger mouthpieces as also described earlier.

I claim:

1. A gauge for measuring the mouthpiece of woodwind instruments comprising:
    table means for supporting the mouthpiece in a fixed position with the mouthpiece facing exposed; a dial indicator; and
    means for supporting the dial indicator for linear motion with respect to the table means and in such a manner that the stem of said dial indicator is maintained in contact with said mouthpiece facing, the dial indicator supporting means including gradation means for indicating the linear position of said dial indicator.

2. The gauge of claim 1 further including a protrusion extending from said dial indicator for contacting said mouthpiece facing.

3. The gauge of claim 2 including a rod support member under said dial indicator.

4. The gauge of claim 3 including a hub under said rod support member for retaining said protrusion.

5. The gauge of claim 1 wherein said gradation means comprise calibrated indicia of said linear position on a rod extending from said dial indicator.

6. The gauge of claim 5 wherein said table means includes an opening defining the shape of a windway slot within said mouthpiece facing.

7. The gauge of claim 6 including guide means on said table means for supporting said rod.

8. The gauge of claim 7 further including a pair of grooves on said guide means for aligning said rod along edges of said table opening.

9. The gauge of claim 8 wherein said edges of said table opening further conform to side rails and a tip rail of said mouthpiece windway.

10. The gauge of claim 6 further including an additional opening through said table means at one end for providing access to said mouthpiece tip and for inserting said dial indicator protrusion to measure an opening in said mouthpiece tip.

11. The gauge of claim 6 wherein said opening comprises a first slot for measuring clarinet side rails and a second slot for measuring saxophone side rails.

12. The gauge of claim 11 wherein said first slot is perpendicular to said second slot.

13. The gauge of claim 1 further including clamp means on a bottom surface of said table means for holding said mouthpiece proximate said bottom surface.

14. The gauge of claim 13 further including a fence depending from a bottom of said table means at one end to provide a stop for a tip portion of said mouthpiece.

15. The gauge of claim 14 wherein said table means is comprised of a metal and said fence and clamp means are comprised of a plastic.

16. The gauge of claim 13 wherein said clamp means comprises a pair of side members attached to said table means by means of fasteners at one end and a bottom member for supporting said mouthpiece, said bottom member extending under said mouthpiece and attaching to each of said side members at an opposite end from said fasteners.

17. The gauge of claim 16 wherein said fasteners comprise a pair of screws.

18. The gauge of claim 1 wherein said gradation means comprise a pair of guide bars supported on said table means.

19. The gauge of claim 18 including a hub between said dial indicator and said table means, said hub including means defining slots for accommodating said guide bars.

20. A method for measuring the mouthpiece of woodwind instruments comprising the steps of:

providing a slotted table and attaching a woodwind mouthpiece containing a windway slot and a tip proximate said table slot;
inserting a protrusion connected with a dial through said slot into contact with a side rail portion along said windway slot; and
moving said dial and dial protrusion along said side rail to read the dimension of said side rail on said dial.

21. The method of claim 20 including the step of providing a calibrated rod along the length of said table and recording the linear displacement of said dial protrusion along said side rail.

22. The method of claim 20 including the step of contacting a tip rail on a mouthpiece facing with said dial protrusion and moving said protrusion along said tip rail to determine readings on said dial and said rod.

23. The method of claim 22 further including the step of inserting said dial protrusion to within a tip opening on one end of said mouthpiece and measuring the dimensions of said tip opening on said dial and said rods.

24. The method of claim 23 further including the step of abutting said mouthpiece tip against a fence depending from said table to maintain said mouthpiece in a fixed position during said measuring.

25. The method of claim 20 further including the step of fastening said mouthpiece to said table by means of a removable clamp.

* * * * *